UNITED STATES PATENT OFFICE 2,306,332

SYNTHESIS OF HYDROXY-CITRONELLAL

Alvin C. Flisik, Haverstraw, and Leonard Nicholl, Nyack, N. Y., assignors to Kay-Fries Chemicals, Inc., West Haverstraw, N. Y., a corporation of New York No Drawing. Application September 12, 1941, Serial No. 410,576

4 Claims. (Cl. 260—598)

This invention relates to improvements in the synthesis of hydroxy-citronellal.

Hitherto, hydroxy-citronellal has been prepared by hydrating the labile form of citronellal sodium bisulphite acid by means of sulphurous addition compound. This reaction has the serious disadvantage of requiring two weeks reaction period for maximum yields, as well as a considerable amount of equipment where quantity production is desired. Furthermore, the yields are only 35–45% based on the citronellal used. A loss of some 20–30% occurs due to the formation of the non-regenerative, stable form of citronellal hydrosulphonate.

Citronellal hydrosulphonic acid, is the compound formed by the acidification of the sodium bisulfite addition compound of citronellal in accordance with the following equations:

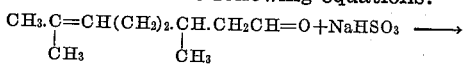

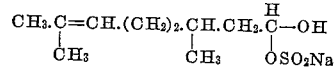

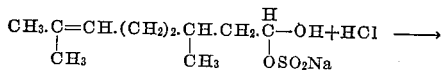

Both this compound and the following similar hydroxy derivative may exist both in a labile and stable form, that is in a form which may or may not react with sodium hydroxide to liberate the original aldehyde again. Thus, the labile form reacts:

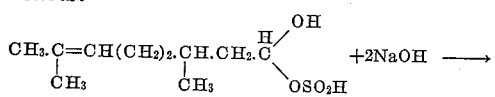

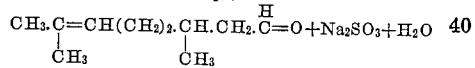

The stable form will not react.

It has now been found that by decreasing the tendency to stable hydrosulphonate formation, desirable increases in yield may be secured. It has been found further that by the use of a stronger acid, such as concentrated hydrochloric acid, the yields of the desired product were increased to 60–70%, and the reaction time very appreciably shortened, that is, from two weeks to three days. The hydrochloric acid used instead of $SO_2$ is found to catalyze the hydration of the double bond in citronellal, and also to prevent the formation of the stable hydrosulphonate.

The hydroxy compound formed on hydration in the reaction mixture under influence of hydrochloric acid is the following:

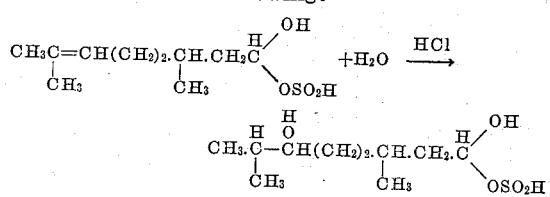

The product of this reaction (labile form) is then decomposed with NaOH solution to liberate hydroxy citronellal according to the equation:

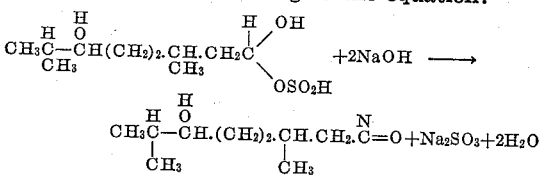

The following examples illustrate the novel procedure of the present disclosure:

I. A solution of $Na_2SO_3$—$NaHCO_3$ was prepared by dissolving 50 grams $Na_2SO_3$ and 34 grams $NaHCO_3$ in 362 grams of distilled water. The solution was filtered and 31 grams 100% citronellal was added. The reaction mass was well agitated for two hours and the precipitate filtered off and sucked as dry as possible. The precipitate is dissolved in 850 c. c. water and then to the solution is added, under low vacuum, 28 c. c. concentrated HCl over a half hour period. The liquid temperature during the addition of acid is maintained at 20–25°. This solution is then allowed to stand for seven days at a temperature of 20–25°. At the end of this time the solution was evaporated to a volume of 300 c. c. under a 20–30 mm. vacuum at a liquid temperature of 25–35°. The hydroxy citronellal was liberated by adding 24% NaOH solution until no more precipitate was formed. The liberated hydroxy-citronellal was extracted with 3–20 c. c. portions of benzene. The combined extractions were washed with 3–20 c. c. portions of water. The excess solvent was removed under vacuum. 20 grams hydroxy-citronellal remained, and this was completely soluble in 35% $NaHSO_3$ solution showing it to be very pure. This corresponds to a yield of 56% based on the citronellal used.

II. A solution of $Na_2SO_3$—$NaHCO_3$ was prepared by dissolving 250 grams $Na_2SO_3$ (100%) and 170 grams $NaHCO_3$ in 1810 grams distilled water. The solution was filtered and 155 grams 100% citronellal was added. The reaction mixture was stirred vigorously for two hours and the precipitated bisulfite addition compound filtered off. A total of 1800 grams of filtrate was recovered, which indicated 180 grams $Na_2CO_3$ present by titration. The precipitate was redissolved in 4500 c. c. water and then under a low vacuum of 500–600 mm. 116 c. c. concentrated HCl was added over a period of three-quarters of an hour. The solution was allowed to stand for two days at 20–25°. The hydration was then stopped by adding 280 c. c. of filtrate. The solution was then evaporated at a maximum temperature of 30–35° until two-thirds of the water had been evaporated. A total of 46 grams of oil separated at this point. It was separated by extraction. The hydroxy-citronellal was liberated by adding 126 c. c. of a 24% solution of NaOH to the evaporated solution in the presence of 185 c. c. toluol. The total volume of solvent and extracted hydroxy-citronellal amounted to 303 c. c. The extract was washed with 3–25 c. c. portions of water. The solvent was then distilled off under a low vacuum, and then the hydroxy-citronellal was distilled off in the presence of 1 gram of added $CaCO_3$, at 108–109°, under a pressure of 3 mm. A total of 100 grams of hydroxy-citronellal was obtained. This indicates a yield of approximately 64%.

What is claimed is:

1. The process of preparing hydroxy-citronellal, comprising preparing citronellal hydrosulphonic acid by reaction of citronellal with a mixture of sodium sulphite and sodium bicarbonate, filtering off the reaction compound, redissolving in water, adding concentrated HCl, allowing the resulting solution to stand for two days at 10–35° C., evaporating the solution to remove substantially two-thirds of the contained water, extracting the by-products from the concentrate and liberating hydroxy-citronellal by reaction with caustic soda solution in the presence of an excess of toluol.

2. The process of preparing hydroxy-citronellal, comprising preparing citronellal hydrosulphonic acid by reaction of citronellal with a mixture of sodium sulphite and sodium bicarbonate, filtering off the reaction compound, redissolving in water, adding concentrated HCl, allowing the resulting solution to stand for two days at 20–25° C., evaporating the solution to remove substantially two-thirds of the contained water, extracting the by-products from the concentrate and liberating hydroxy-citronellal by reaction with caustic soda solution in the presence of an excess of toluol.

3. The process according to claim 1, including the step of purifying the extracted hydroxy-citronellal by washing with a plurality of portions of water, removing the solvent under vacuum, adding a minor amount of calcium carbonate to the distilling flask and distilling off the hydroxy-citronellal under vacuum.

4. The process according to claim 2, including the step of purifying the extracted hydroxy-citronellel by washing with a plurality of portions of water, removing the solvent under vacuum, adding a minor amount of calcium carbonate and distilling off the hydroxy-citronellal under vacuum.

ALVIN C. FLISIK.
LEONARD NICHOLL.

CERTIFICATE OF CORRECTION.

December 22, 1942.

Patent No. 2,306,332.

ALVIN C. FLISIK, ET AL.

It is hereby certified that error appears in the printed specification of the above numbered patent requiring correction as follows: Page 1, first column, lines 5 and 6, for "acid by means of sulphurous addition compound" read --addition compound by means of sulphurous acid--; and that the said Letters Patent should be read with this correction therein that the same may conform to the record of the case in the Patent Office.

Signed and sealed this 16th day of February, A. D. 1943.

Henry Van Arsdale,
Acting Commissioner of Patents.

(Seal)